(12) United States Patent
Horn et al.

(10) Patent No.: US 8,972,690 B2
(45) Date of Patent: Mar. 3, 2015

(54) METHODS AND APPARATUSES FOR USAGE BASED ALLOCATION BLOCK SIZE TUNING

(76) Inventors: Deric Horn, Los Gatos, CA (US); Donald James Brady, Woodland Park, CO (US); David Alexander Majnemer, Great Neck, NY (US); Eric Brandon Tamura, Sunnyvale, CA (US)

( * ) Notice: Subject to any disclaimer, the term of this patent is extended or adjusted under 35 U.S.C. 154(b) by 837 days.

(21) Appl. No.: 12/652,688

(22) Filed: Jan. 5, 2010

(65) Prior Publication Data

US 2011/0167239 A1 Jul. 7, 2011

(51) Int. Cl.
*G06F 12/02* (2006.01)
*G06F 17/30* (2006.01)
*G06F 11/34* (2006.01)

(52) U.S. Cl.
CPC .......... *G06F 17/30129* (2013.01); *G06F 11/34* (2013.01); *G06F 2201/865* (2013.01); *G06F 2201/88* (2013.01)
USPC .......................................... 711/170; 711/171

(58) Field of Classification Search
CPC .............. G06F 11/34; G06F 17/30129; G06F 2201/865; G06F 2201/88
See application file for complete search history.

(56) References Cited

U.S. PATENT DOCUMENTS

| | | | |
|---|---|---|---|
| 6,347,366 B1* | 2/2002 | Cousins | 711/170 |
| 7,062,608 B2 | 6/2006 | Le Moal et al. | |
| 7,107,427 B2* | 9/2006 | Nakano et al. | 711/170 |
| 7,181,588 B2* | 2/2007 | Johnson et al. | 711/173 |
| 7,222,216 B2 | 5/2007 | Guha et al. | |
| 7,447,843 B2 | 11/2008 | Ishikawa et al. | |
| 2002/0046204 A1* | 4/2002 | Hayes | 707/1 |
| 2009/0002761 A1* | 1/2009 | La et al. | 358/1.16 |
| 2009/0235042 A1 | 9/2009 | Petrocelli | |
| 2010/0082900 A1* | 4/2010 | Murayama et al. | 711/114 |

OTHER PUBLICATIONS

Limitations of FAT32 file system, Microsoft Suppor Article ID: 184006, Mar. 27, 2007; Online: http://support.microsoft.com/kb/184006.*
Wendy Zhang, Ernst L. Leiss, "Block Mapping—A Compiler Driven I/O Management Study", 7 pgs.

* cited by examiner

*Primary Examiner* — Matthew Bradley
*Assistant Examiner* — Ramon A Mercado
(74) *Attorney, Agent, or Firm* — Womble Carlyle Sandridge & Rice, LLP (57) ABSTRACT

Methods and apparatuses that maintain an access history of a file allocated with allocation blocks in storage devices are described. In response to receiving a usage request to allocate additional space for the file, an allocation block size may be adjusted or adapted based on the access history. The storage devices may be allocated with one or more allocation blocks using the adapted allocation block size to provide requested space for the file.

21 Claims, 5 Drawing Sheets

METHODS AND APPARATUSES FOR USAGE BASED ALLOCATION BLOCK SIZE TUNING

FIELD OF INVENTION

The present invention relates generally to file systems. More particularly, this invention relates to allocating blocks in storage devices for a file.

BACKGROUND

Most traditional file systems allocate disk space in units of storage space called allocation blocks or blocks. Uniform sized blocks are commonly supported across an entire file system. For instance, if a file system is created with blocks of 128K (bytes) in size, a new file created with a single byte written to it will consume 128K of storage space, because the file system will allocate 128K at a time, even if less is needed. When receiving a request to write 4K of data to a file, the file system may have to, in turn, first read a 128K size allocation block from a disk into memory, overwrite the 128K size block in memory with the 4K size data, and then write the entire 128K size block back to the disk. This causes performance overhead due to reading and writing the extra 124K of the block when that data are not needed or may not be initialized. This performance overhead has the cost of pushing other blocks out of virtual memory which may cause additional I/O activities.

On the other hand, using a small allocation block size, such as 4K, may require too much extra resources to be feasible for certain applications. For example, the smaller the block size, the larger the overhead of internal metadata structures in a file system, such as an associated checksum and pointers for each allocation block. As such, the amount of metadata that has to be read and paged into memory may increase 32 times when the allocation block size is reduced from 128K to 4K. In addition, media files such as movies and pictures tend to benefit from a lower overhead of using larger block sizes, when their data is intended to be read contiguously, rather than in a piecemeal fashion.

Furthermore, a uniform allocation block size for a file system may have a negative performance impact because different applications may access files in chunks of data in different sizes. For example, a database application, such as SQLite, may access record data from database files in units of 2K-4K sizes, known as the record size. Traditionally, a special file system may be required for the database application to allow manual configuration of an allocation block size matching the record size. However, as more and more different applications, e.g. mail, address book, photographs, and database, etc. are integrated under a high level framework, such as CoreData from Apple Inc., a specifically provisioned file system for one single application may not satisfy requirements of other applications.

Even if certain file systems, such as ZFS (Zettabyte File System), may support different sized allocation blocks within a single file system, these designs tend to be aggressively biased towards using a fixed target block size (e.g. 128K) as soon as the file is of a size no less than the fixed target block size (e.g. 128K).

Thus, traditional file systems do not adapt their access to associated storage media to account for the way certain applications use files without a manual intervention from the user. Generally, a user must identify performance bottlenecks before creating the file system in order to configure it appropriately.

SUMMARY OF THE DESCRIPTION

An embodiment of the present invention can include methods and apparatuses that maintain an access history of a file allocated with allocation blocks in storage devices. In response to receiving a usage request to allocate additional space for the file, an allocation block size may be adjusted or adapted based on the access history. The storage devices may be allocated with one or more allocation blocks using the adapted allocation block size to provide requested space for the file. A usage request can be a read request or a write request.

In an alternative embodiment, in response to receiving a usage request to store a region of data for a file in a file system, a configured block size is identified for the file. A usage history of the file may be updated with the usage request including the size of the data. If no configuration of block size is identified, an adaptive allocation block size may be adjusted from the updated usage history. The storage space may be allocated in units of the adaptive allocation block size to store the data for the file.

In yet an alternative embodiment, a file system may dynamically adjust allocation block size on a per file basis for optimal I/O (input/output) performance. An allocation block size for a file may be determined based on attributes of the file, such as content type stored in a file, application type associated with a file, run time configurations for the file, and/or the size of the file. Alternatively, the allocation block size may be adapted according to a usage pattern identified from a history of I/O operations performed or requested for the file.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for usage based allocation block size tuning are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a file system is disclosed to optimize I/O performance for a file without requiring user interactions. A heuristic may be defined for an optimal allocation block size on a file-by-file basis by monitoring a history of I/O (input/output) requests or usage requests to each individual file. Once I/O access patterns are established from a history of usage requests to a file, such as an average data size in I/O requests, an ideal allocation block size can be mapped accordingly for further accesses to the file. The mapping may take into consideration a VM (Virtual Memory) page size, a cache block size, and/or other characteristics of a file system. In some embodiments, requests for updating a portion of a file, for example, the first 128K, may be examined to adapt an allocation block size for the file. I/O performance for a file in a file system may be improved by more than 5-10 times without affecting the I/O performance of other files by adapting allocation block sizes for the file.

In some embodiments, API (Application Programming Interfaces) may be provided to set an allocation block size on a per-file basis. For example, an allocation block size may be set via an API when a usage history is not available, such as when a database file is copied into a file system. In one embodiment, an allocation block size for a file may be determined based on a usage pattern identified from a usage history and/or settings received from APIs. A file system may be enabled to incorporate an expected future usage pattern via APIs to adapt an allocation block size.

Figure 1:
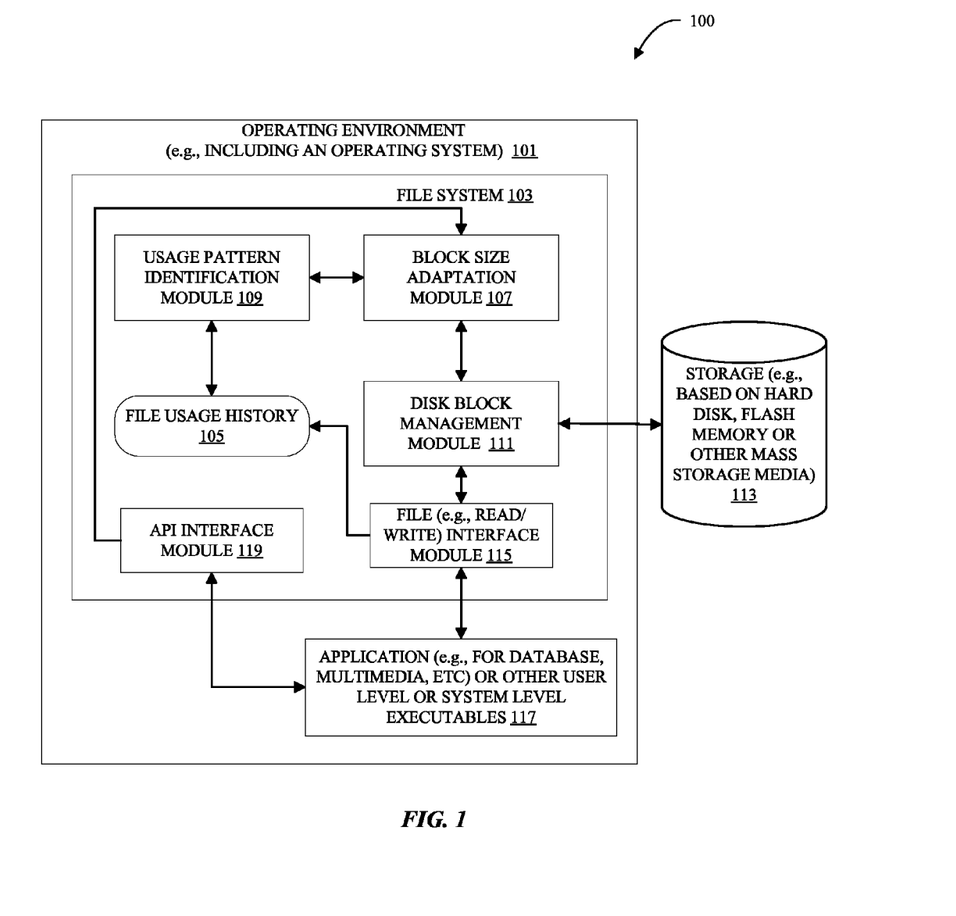
FIG. 1 is a block diagram illustrating one embodiment of a system for tuning an allocation block size.

FIG. 1 is a block diagram illustrating one embodiment of a system for tuning an allocation block size. In one embodiment, system 100 may include a computer operating environment 101 having a file system 103 in an operating system. Storage 113 may be one or more storage device, such as hard disks, flash memories or other mass storage media, locally or remotely coupled to computer operating environment 101. In one embodiment, files in system 100 may be stored in one or more blocks allocated in storage 113. Application 117 or system services may use or access files via file system 103, for example, to read and/or write one or more files stored in storage 113.

In one embodiment, file system 103 may include block management module 111 to manage blocks allocated in storage 113 for storing or retrieving chunks of data partitioned or split from a file. Typically, block management module 111 can access a file in storage 113 based in units of blocks allocated (or allocation blocks). Block management module 111 may vary allocation block sizes for different files and/or for a file at different stages (e.g. based on sizes) to optimize performances for expected I/O access to each file. In one embodiment, block management module 111 may rely on block size adaptation module 107 to provide an optimized size for an allocation block to write data to a file.

File interface module 115 can receive file I/O requests from applications, system services and/or other executables 117 to use or access (e.g. read or write) a file managed in file system 103. In one embodiment, file interface module 115 may forward received file I/O requests to block management module 111 to perform file I/O operations on files stored in storage 113. Optionally, file interface module 115 can update file usage history 105 with the received file I/O requests.

In one embodiment, file usage history 105 may include a history of usage records for the files managed in file system 103. A usage record may include, for example, a data access size associated with an I/O request for a file, a type of an I/O request, and/or a time stamp for an I/O request, etc. File usage history 105 may store file usage (e.g. I/O requests) history on a per file basis. In some embodiments, file usage history 105 may be based on data structures allocated to represent files in file system 103.

According to one embodiment, usage pattern identification module 109 can determine a usage pattern of a file from file usage history 105. A usage pattern may be, for example, a statistics obtained from records of usage requests for a file during a (past) period of time. In one embodiment, a usage pattern may be an average data access size for each usage record stored, an average data access size over a certain number of most recent usage requests, a median data access size among a number of selected usage records, or other applicable statistics. Usage pattern identification module 109 may identify a usage pattern for a file in response to request from block size adaptation module 107. Alternatively, usage pattern identification module 109 may dynamically update file usage history 105 with identified usage patterns, for example, for each file usage request received in file system 103.

In one embodiment, block size adaptation module 107 may determine an allocation block size for disk block management module 111 to allocate storage space for a file in units of the determined block size in response to a usage request. For example, block size adaptation module 107 can retrieve a usage pattern of a file from usage pattern identification module 109 to tune an allocation block size for a usage request for the file to achieve optimal file I/O performance. In one embodiment, block size adaptation module 107 can select an allocation block size based on certain attributes of a file usage request and/or the associated file, such as a type of the file, whether the file is a new file, and/or a size of data associated with the file usage request, etc.

Additionally, block size adaptation module 107 may consider settings for allocation block sizes received from API interface module 119 to determine an optimal allocation block size for a file. An API interface module 119 may enable applications, such as application 117, to specify settings of allocation blocks sizes for one or more files. For example, application 117 may set a block size of 2M for a file in anticipating an I/O operation to copy a 5M size data to the file. In some embodiment, settings for an allocation block size may include attributes specifying when and/or how the settings are applied, such as whether the settings have expired, whether the settings has a higher priority than a usage history, and/or whether the settings should be combined with a usage history, etc.

Figure 2:
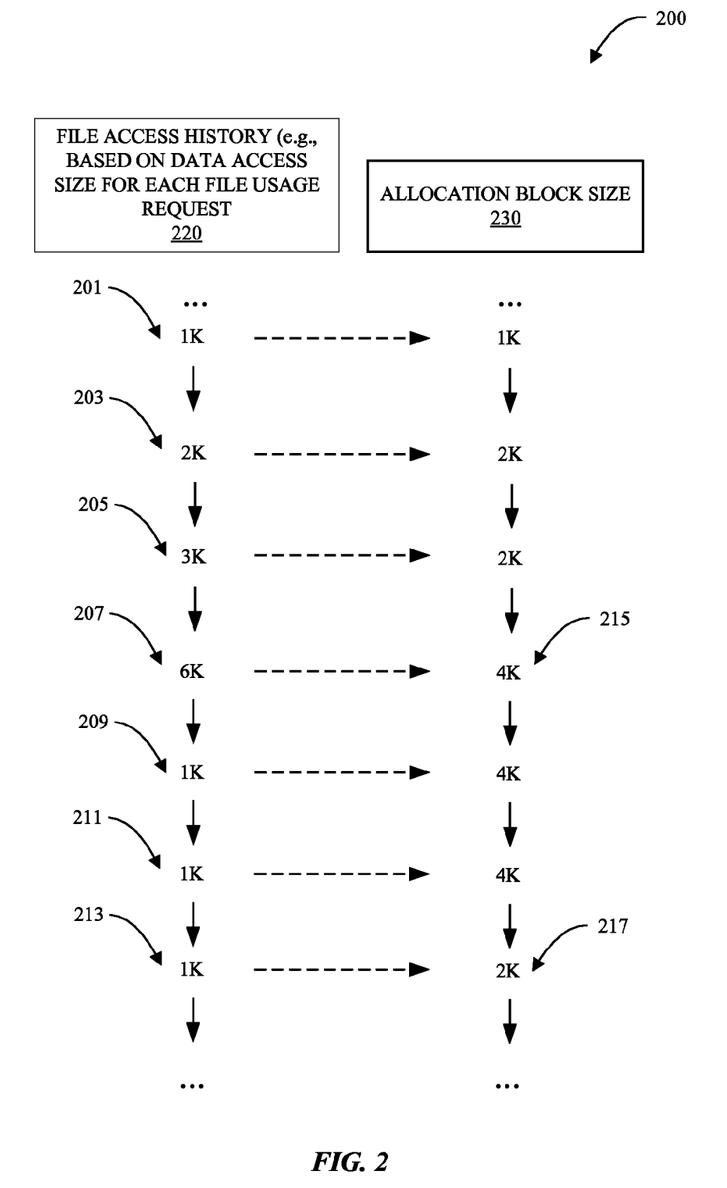
FIG. 2 is a sample diagram illustrating an example of tuning an allocation block size according to one embodiment of the present invention.

FIG. 2 is a sample diagram illustrating an example of tuning an allocation block size according to one embodiment of the present invention. Example 200 may be based on a file system allocating blocks for storing files in a storage using different allocation block sizes, such as in system 100 of FIG. 1. In one embodiment, file access history 220 may represent data access sizes for a sequence of usage requests (e.g. write requests) in a portion of usage records for a file, e.g. stored in file usage history 105 of FIG. 1.

Allocation block size 230 may represent a sequence of adapted (or tuned) allocation block sizes, e.g. based on block size adaptation module 107 of FIG. 1, in response to a sequence of access requests represented in file access history 220. For example, request record 207 may be associated with a file usage request to write 6K of data. In one embodiment, a usage pattern based on, e.g. an average of, at least request records 201, 203, . . . 205 and 207 may adapt an allocation block size as 4K 215, e.g. according to a power of 2 number selected from the average (3K=12K/4). Subsequently, request record 213 may indicate a file usage request to write 1K of data for the same file. An allocation block size corresponding to request record 213 may be adapted down to 2K 217 from 4K according to at least a usage history based on request records 201, 203, . . . 211 and 213.

Figure 3:
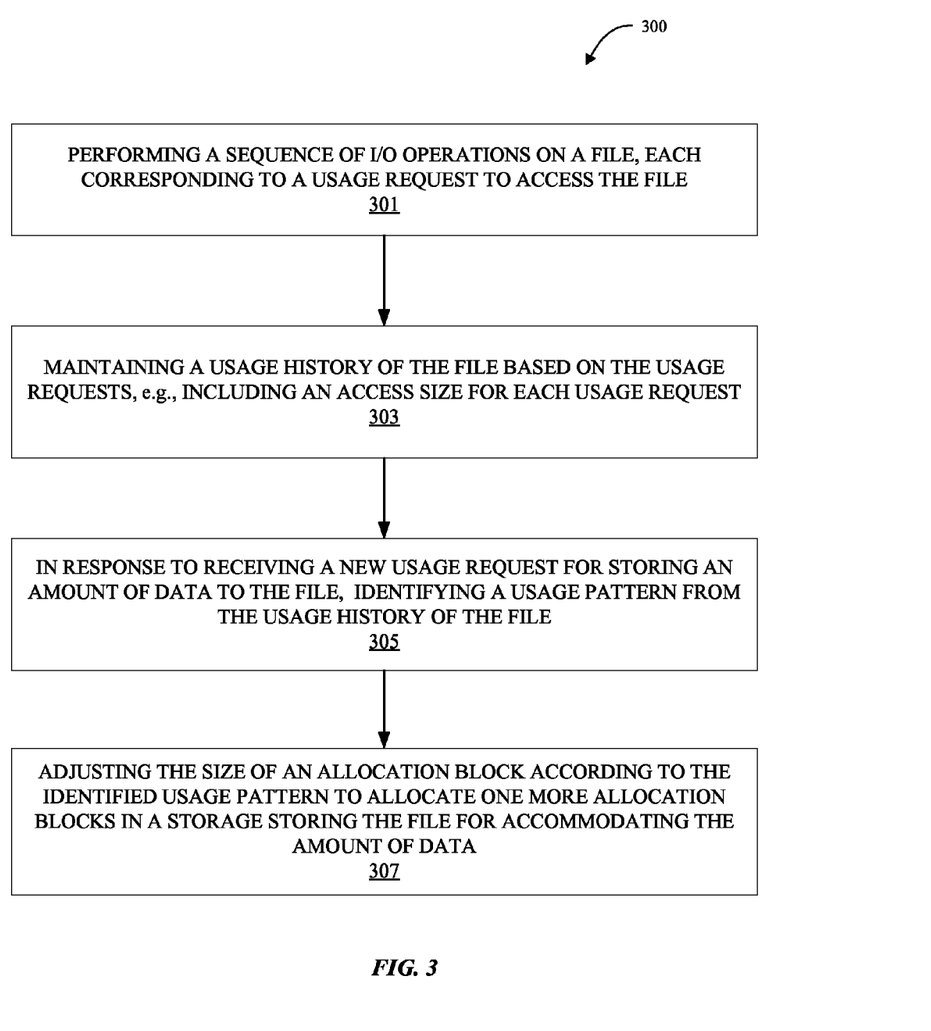
FIG. 3 is a flow diagram illustrating one embodiment of a process to adjust an allocation block size.

FIG. 3 is a flow diagram illustrating one embodiment of a process to adjust an allocation block size. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. The processing logic of process 300 may perform a sequence of I/O operations for a file at block 301, such as file read/writes' in response to usage requests to access the file from. Typically, a usage request may be associated with an access size for writing or reading data to or from a file stored in one or more storage devices.

In one embodiment, at block 303, the processing logic of process may maintain a usage history of a file based on a sequence of usage requests to access the file. The processing logic of process 300 may monitor (e.g. periodically or on demand) each usage request, e.g. file read/write requests, to the file and record a history accordingly. A usage history for a file may include an access size and a time stamp for each usage request for the file during a period of time. For example, a usage history for a file may be recorded from when the file is first created. Alternatively, a usage history may be updated for a number of most recent usage requests or during a most recent period of a preconfigured time length.

At block 305, according to one embodiment, the processing logic of process 300 may receive a new usage request, such as a file write request, for storing an amount of data to a file. In response, the processing logic of process 300 may identify a usage pattern for the new usage request from a usage history associated with the file. In one embodiment, a data structure representing a file in a file system may include a usage history for the file. Alternatively, usage histories may be separately stored on a per file basis. The processing logic of process 300 may update the usage history with the newly received usage request.

A usage pattern may be one or more heuristics determined from recorded usage requests. For example, a usage pattern may be an average access size, a mean access size, or other statistics derived from the recorded usage requests and/or a newly received usage request. A usage pattern may depend on a selected portion of recorded usage requests, e.g. file read requests. Alternatively, a usage pattern may depend on a current status of a file, such as a type of the file, a configuration setting for the file, the size of the file, which device the file is currently stored, and/or other metadata associated with the file, etc. In one embodiment, the processing logic of process 300 may incrementally update a usage pattern or other usage statistics for a file, e.g. an average access size, with each usage request received to represent a usage history for the file without a need to store a record for each usage request.

At block 307, according to one embodiment, the processing logic of process 300 may adjust an allocation block size according to a usage pattern identified. For example, the processing logic may select an allocation block for a file by rounding up an identified usage pattern as an average access size (in units of K bytes). The processing logic of process may allocate one or more blocks in units of the allocation block size in a storage to accommodate an amount of data associated with a usage request, e.g. to write the amount of data to the file.

Figure 4:
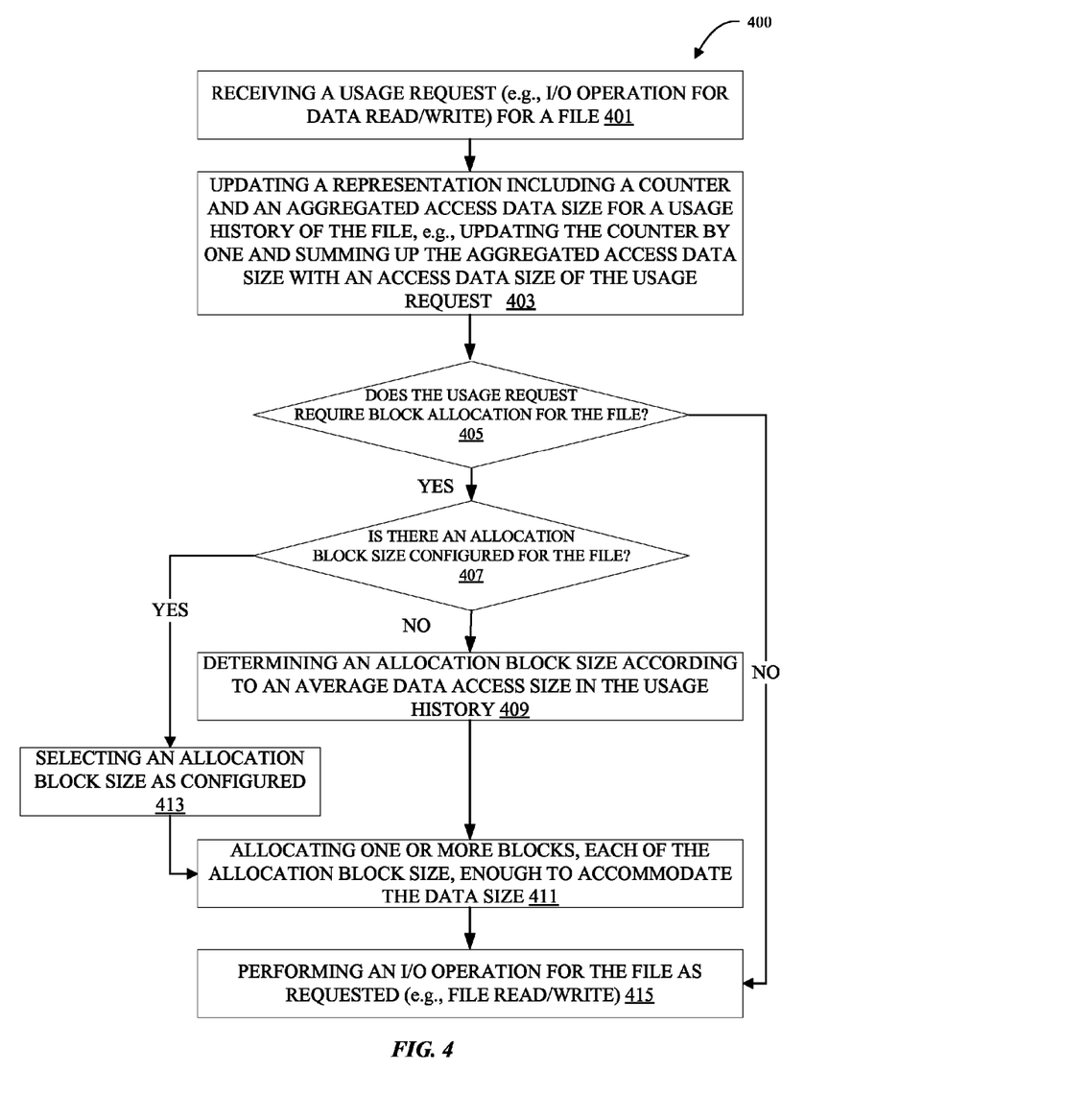
FIG. 4 is a flow diagram illustrating one embodiment of a process to determine an allocation block size in response to a usage request for a file.

FIG. 4 is a flow diagram illustrating one embodiment of a process to determine an allocation block size in response to a usage request for a file. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. In one embodiment, at block 401, the processing logic of process 400 may receive a usage request, e.g. data read/write, for a file stored in a storage, such as storage 113 of FIG. 1.

In one embodiment, each file may be associated with a usage history, for example, represented by a counter and an aggregated data access size. A counter for a usage history may indicate a total number of usage or access requests monitored or recorded during a past period of time for a file. Each usage request may be associated with a data access size, e.g. amount of data for read/write operations. An aggregated data access size for a usage history may be based on a sum of data access sizes of the access requests monitored. At block 403, the processing logic of process 400 may update a representation of a usage history with a received usage request. For example, the processing logic of process 400 can increase the counter by one and sum together the aggregated access data size with a data size associated with the received usage request.

At block 405, in one embodiment, the processing logic of process 400 may determine whether a received usage request for a file require allocating additional blocks in storage devices storing the file. A usage request to read data from a file or delete data from the file may not require allocating new blocks. If the blocks allocated for a file storage devices include enough available capacity to accommodate an amount of data associated with a usage request to write data to the file, allocation of new blocks for the usage request might not be required.

According to one embodiment, if block allocation is required, at block 407, the processing logic of process 400 can determine whether an allocation block size is configured for a file. For example, system configurations may specify an allocation block size for a file based on a size of the file, a type of the file (e.g. a database file, a multimedia file . . . ) or other attributes of the file. In one embodiment, if a file is larger than a certain threshold size (e.g. a preconfigured size such as 128K bytes), a fixed allocation block size may be applied. Alternatively, if storage space (or blocks) has not been allocated for a file (e.g. a new file), a default allocation block size may be employed. In some embodiments, separate allocation block sizes may be configured for different types of files, e.g. a small allocation block size (e.g. 2K) for a database file and/or a large allocation block size (e.g. 128K) for a multimedia file.

In one embodiment, the processing logic of process 400 may have received a setting via APIs, e.g. from an application or system services, etc., to configure an allocation block size for a file. Optionally, a usage request (e.g. a write request) may include settings specifying recommended allocation block sizes. The processing logic of process 400 may determine whether a setting for an allocation block size is valid, e.g. whether the setting has expired. The processing logic of process 400 may honor an allocation block size specified in a valid setting received via APIs. In some embodiment, a usage request may include a tag indicating a type of I/O operation, e.g. an "archival" tag for archiving a file. The processing logic of process 400 may select a large allocation block size for archiving a file. If a configuration for an allocation block size is identified for a file, at block 413, the processing logic of process 400 may select the allocation block size as configured.

At block 409, the processing logic of process 400 can determine an allocation block size if an adaptive block size is required. In one embodiment, the processing logic of process 400 can identify a usage pattern for a file as an average data access size based on a counter and an aggregated data access size in a usage history. Typically, storage space allocated in a storage device may be in units of an allocation block having a size in power of 2, e.g. 1K bytes, 2K bytes, 4K bytes . . . etc. The processing logic of process 400 can select an adaptive allocation block size according to the average data access size rounded (e.g. up or down) to the closest power of 2.

Subsequently at block 411, for example, the processing logic of process 400 can allocate a sufficient number of blocks in a storage device, each block having a determined (or adapted) allocation block size, to accommodate data associated with a received usage request for a file. The processing logic of process 400 can perform I/O operations for the file at block 415 as requested in the usage request, such as writing the data to the allocated blocks having the adaptive allocation block size.

Figure 5:
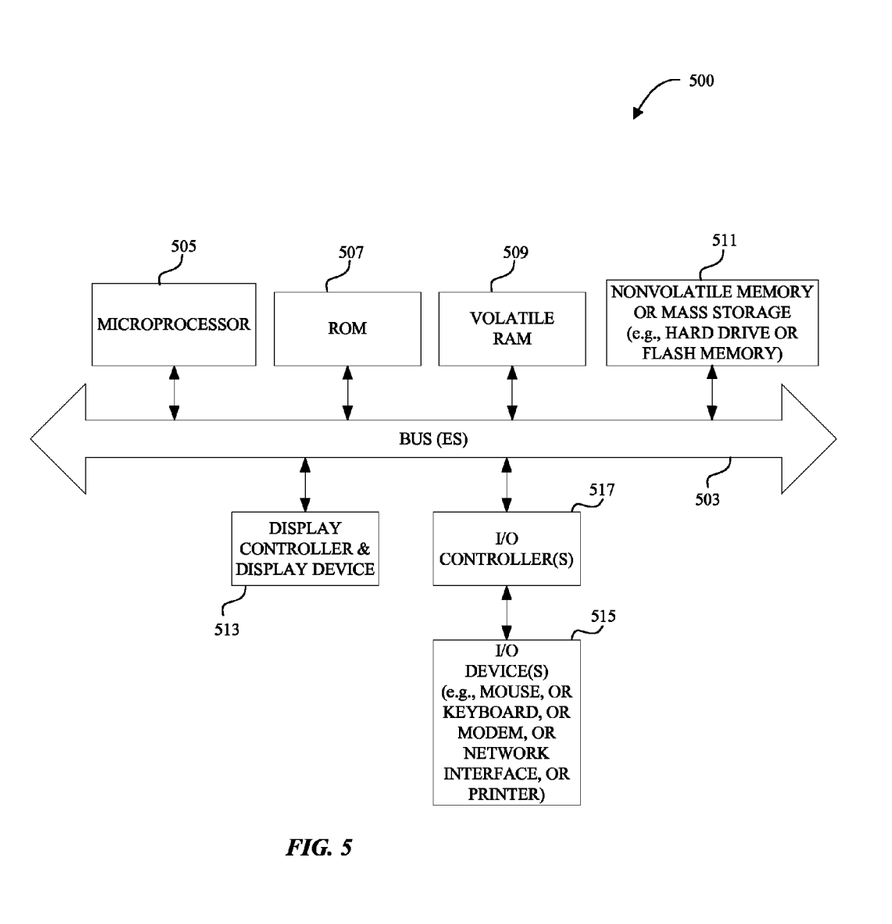
FIG. 5 illustrates one example of a data processing system such as a computer system, which may be used in conjunction with the embodiments described herein.

FIG. 5 shows one example of another data processing system such as a computer system, which may be used with one embodiment the present invention. For example, the system 500 may be implemented as a part of the system shown in FIG. 1. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (I/O) devices which may be mice, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g. large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method for managing allocation block sizes of files stored in a storage device, the method comprising:
    maintaining, for each file stored in the storage device, a usage history of past usage requests for the file, wherein the usage history includes a counter that indicates a number of the past usage requests received for the file and an aggregated data access size based on a sum of data sizes associated with the usage requests;
    receiving a new usage request to access a particular file;
    determining that the new usage request requires allocating additional blocks in the storage device;
    identifying an average data access size based on the counter and the aggregated data access size in the usage history of the particular file; and
    allocating one or more blocks in the storage device for the new usage request, wherein each block of the one or more blocks has a block size that is determined according to the average data access size.

2. The computer-implemented method of claim 1, further comprising:
    adding the new usage request to the usage history; and
    incrementing the counter.

3. The computer-implemented method of claim 2, wherein adding the new usage request to the usage history includes storing a time stamp associated with a receipt of the new usage request.

4. The computer-implemented method of claim 2, wherein adding the new usage request to the usage history includes storing a data request size for the particular file specified in the new usage request.

5. The computer-implemented method of claim 4, further comprising:
    updating the aggregated data access size with the data request size associated with the new usage request.

6. The computer-implemented method of claim 1, wherein the average data access size is rounded to a nearest power of two.

7. The computer-implemented method of claim 1, wherein the new usage request specifies a data request size that is larger than the one or more blocks.

8. A non-transitory machine-readable storage medium having instructions that, when executed by a machine, cause the machine to carry out steps that include:
    maintaining, for each file stored in a storage device, a usage history of past usage requests for the file, wherein the usage history includes a counter that indicates a number of the past usage requests received for the file and an aggregated data access size based on a sum of data sizes associated with the usage requests;
    receiving a new usage request to access a particular file;
    determining that the new usage request requires allocating additional blocks in the storage device;
    identifying an average data access size based on the counter and the aggregated data access size in the usage history of the particular file; and
    allocating one or more blocks in the storage device for the new usage request, wherein each block of the one or more blocks has a block size that is determined according to the average data access size.

9. The non-transitory machine-readable storage medium of claim 8, wherein the steps further include:
    adding the new usage request to the usage history; and
    incrementing the counter.

10. The non-transitory machine-readable storage medium of claim 9, wherein adding the new usage request to the usage history includes storing a time stamp associated with a receipt of the new usage request.

11. The non-transitory machine-readable storage medium of claim 9, wherein adding the new usage request to the usage history includes storing a data request size for the particular file specified in the new usage request.

12. The non-transitory machine-readable storage medium of claim 11, wherein the steps further include:
    updating the aggregated data access size with the data request size associated with the new usage request.

13. The non-transitory machine-readable storage medium of claim 8, wherein the average data access size is rounded to a nearest power of two.

14. The non-transitory machine-readable storage medium of claim 8, wherein the new usage request specifies a data request size that is larger than the one or more blocks.

15. An apparatus, comprising:
    a memory;
    a storage device; and
    a processor coupled to the storage device and the memory, wherein the processor is configured to:
        maintain, for each file stored in the storage device, a usage history of usage requests for the file, wherein the usage history includes a counter that indicates a number of the past usage requests received for the file and an aggregated data access size based on a sum of data sizes associated with the past usage requests;
        receiving a new usage request to access a particular file;
        determining that the new usage request requires allocating additional blocks in the storage device;

identifying an average data access size based on the counter and the aggregated data access size in the usage history of the particular file; and allocating one or more blocks in the storage device for the new usage request, wherein each block of the one or more blocks has a block size that is determined according to the average data access size.

16. The apparatus of claim 15, wherein the processor is further configured to:

add the new usage request to the usage history; and increment the counter.

17. The apparatus of claim 16, wherein, to add the new usage request to the usage history, the processor is further configured to store a time stamp associated with a receipt of the new usage request.

18. The apparatus of claim 16, wherein, to add the new usage request to the usage history, the processor is further configured to store a data request size for the particular file specified in the new usage request.

19. The apparatus of claim 18, wherein the processor is further configured to update the aggregated data access size with the data request size associated with the new usage request.

20. The apparatus of claim 16, wherein the average data access size is rounded to a nearest power of two.

21. The apparatus of claim 16, wherein the new usage request specifies a data request size that is larger than the one or more blocks.

* * * * *

UNITED STATES PATENT AND TRADEMARK OFFICE
CERTIFICATE OF CORRECTION

| | |
|---|---|
| PATENT NO. | : 8,972,690 B2 |
| APPLICATION NO. | : 12/652688 |
| DATED | : March 3, 2015 |
| INVENTOR(S) | : Deric Horn et al. |

It is certified that error appears in the above-identified patent and that said Letters Patent is hereby corrected as shown below:

In the claims,

Column 9, line 45 (Claim 1, line 9): "the usage requests;" should read -- the past usage requests; --.

Column 10, line 20 (Claim 8, line 9): "the usage requests;" should read -- the past usage requests; --.

Column 10, line 60 (Claim 15, line 7): "usage requests" should read -- past usage requests --.

Signed and Sealed this
Third Day of November, 2015

Michelle K. Lee
*Director of the United States Patent and Trademark Office*